United States Patent [19]

Schacht

[11] Patent Number: 5,782,172
[45] Date of Patent: Jul. 21, 1998

[54] APPLIANCE FOR LOW AND HIGH-HEAT COOKING

[76] Inventor: Paul Schacht, 3, Horschelstr., Munich 80796, Germany

[21] Appl. No.: 695,889

[22] Filed: Aug. 12, 1996

Related U.S. Application Data

[63] Continuation of Ser. No. 411,813, filed as PCT/EP93/02757 published as WO94/08498, abandoned.

[30] Foreign Application Priority Data

Oct. 8, 1992 [DE] Germany ............. 42 33 940.5
Nov. 9, 1992 [DE] Germany ............. 42 37 759.5

[51] Int. Cl.$^6$ ................................................ A47J 37/06
[52] U.S. Cl. ............................ 99/422; 99/424; 99/450
[58] Field of Search ........................ 99/422, 424, 447, 99/450, 385, 401; 219/462, 463, 464; 126/373, 374

[56] References Cited

U.S. PATENT DOCUMENTS

| | | | |
|---|---|---|---|
| 486,157 | 11/1892 | Cloud | 126/374 |
| 1,139,445 | 5/1915 | Pierce | 99/422 |
| 2,299,596 | 10/1942 | Rycroft . | |
| 2,402,997 | 7/1946 | Grayson | 126/374 |
| 2,430,715 | 11/1947 | Grayson | 126/374 |
| 3,289,664 | 12/1966 | Hewitt . | |
| 3,463,076 | 8/1969 | Keating | 99/422 |
| 3,826,898 | 7/1974 | Hurko et al. | 219/462 |
| 3,845,273 | 10/1974 | Hurko . | |
| 4,342,259 | 8/1982 | Lee | 99/447 |
| 4,353,347 | 10/1982 | Seed | 99/450 |
| 4,772,777 | 9/1988 | Weller et al. | 126/374 |
| 4,843,218 | 6/1989 | Husslein et al. | 219/464 |
| 5,129,314 | 7/1992 | Hu | 99/422 |
| 5,221,829 | 6/1993 | Yahav et al. | 219/464 |

FOREIGN PATENT DOCUMENTS

| | | |
|---|---|---|
| 82 04 675 | 2/1982 | Germany . |
| 88 16 255 | 6/1988 | Germany . |
| 91 11 759 | 9/1991 | Germany . |
| 334568 | 1/1959 | Switzerland . |

*Primary Examiner*—David Scherbel
*Assistant Examiner*—James F. Hook
*Attorney, Agent, or Firm*—McDermott, Will & Emery

[57] ABSTRACT

The invention concerns a roasting and cooking device which can be designed as a table for social cooking and eating, with a foot, a leg and a metal tabletop whose edge is surrounded by a closed metal profile and on whose underside is located a device designed to heat the central zone of the table top. The leg is fixed to the table top outside the zone in which the heating device is fitted. Ideal conditions are created for the operation of the device by virtue of the fact that thermal expansion of the table top produces a depression in the central zone of the table top and, when the device is designed as a table, the unheated edge zones of the table top can be used for eating, leaving an intermediate zone available for keeping food warm.

25 Claims, 5 Drawing Sheets

APPLIANCE FOR LOW AND HIGH-HEAT COOKING

This application is a continuation of application Ser. No. 08/411,813, filed as PCT/EP93/02757 published as WO94/08498, now abandoned.

BACKGROUND OF THE INVENTION

1. Field of the Invention

The invention relates to an appliance for cooking on low and/or high-heat, which can be placed in an opening of a table or the like, or can be used as part of a table construction designed for a social gathering for cooking and dining.

In a social gathering, food such as meat, sausages or the like is often prepared by way of grilling. Other types of social cooking are a meat or cheese fondue, or cooking in a wok. During these types of cooking, it is customary to perform the cooking at a central location partly situated outside the dining area and to finally distribute the food on several plates for eating the food at a different place. However, it is especially entertaining and also enjoyable, when the participants of such a dinner are seated around one table and when all pertaining kinds of food are jointly prepared and eaten on location, as it is done when preparing a fondue.

2. Description of the Prior Art

From DE 991 11 756 a table for party purposes is known at which a steel tabletop is heatable in its central area by a gas flame and the tabletop having a permanently trimmed-in trough in its central area from the edge of which the tabletop extends radially to the outside without convexity. Radial heat dilation slots are provided for cooling the edge so that the edge of the table reaches a faultless dilatability between the heat dilation slots. Profiled wooden borders are provided with some play in order to terminate the tableplate in nice visual design, which can be easily removed and fitted back again for cleaning. The existing heat dilating slots not only fail to create a consistent outward appearance of the table, but also bear the risk that food, sauces, fat and the like will run through them in an unwanted manner causing contamination. The edge-side installable profiles are also hard to handle and to clean.

SUMMARY OF THE INVENTION

The invention provides an appliance for low and/or high-heat cooking, allowing people to be seated at a plate edge and to enjoy their meals without being impaired by heat, sauces, fat, or the like.

The invention provides an appliance that can be inserted into an existing opening of a table or the like or that can be a part of a table construction. A tabletop in the form of a fine steel plate is of advantage, because the slow heat-conducting features of fine steel allow persons seated around the appliance to have a meal and even to place their plates and glasses in the peripheral area of the plate. Disadvantageous heat dilating slots can be eliminated due to the temperature conditions reached by this method. It is also advantageous that the dilation caused by heating of the fine steel profile can be controlled in such a way that the fine steel plate does not dilate radially, but receives an axial, even, and wave-free deformation that practically extends evenly from the edge to the plate center. This leads to the formation of an even trough-shaped deformation pointed downwards across the entire tabletop by the dead weight of the material. By this method, pouring of sauces, fat and the like towards the edge of the fine steel plate or even into the seating area of the different persons can be avoided. Furthermore, incorporating a fine steel plate finish allows easy cleaning after use.

When including the appliance as part of a table construction, the dilation of the tabletop by trimmed-in stiffening of the edge can be limited in such a way that, in the convexity provided by the dead weight in the center of the tabletop, which is about 2 mm in cold condition, a trough or depression of up to 25 mm is formed, instead of an uncontrollably wavy deformation.

In addition to the clamping of the plate at its side edges, the trough-shaped deformation pointing downwards can be additionally supported by the dead weight of a heating device fixed in a hanging position on the bottom side of the plate and its dead weight, whereby according to a preferred design, the supporting fastening of the plate at the leg section is realized with the help of a supporting housing via a support operating radially outside the heating device hanging only on the plate.

The edge-side profile is preferably fixed to the fine steel plate and preferably contains at least one single beveled edge pointing downwards. Alternatively, the edge-side fine steel profile consists of a separate metal profile with a closed diameter which is welded away from the center and close to the edge of the fine steel plate. For reasons of better workability, the welding is performed in such a way that a major part of the pipe diameter is located below the fine steel plate, the size of which is $\frac{1}{5}$ to $\frac{1}{2}$ of the fine steel profile height. Since the metal profile consists preferably of fine steel, an even outward appearance is created.

Heating of the bottom side plate center can be done by any suitable heating device. As provided by the invention, a radiation source should preferably be used which is pointed towards a preferably blackened center of the plate. The blackening in the central area is designed to enhance the reception and distribution of the heat. According to a preferred alternative design of the invention, at least one heat-distributing plate-shaped element is provided which is preferably fixed at the bottom side to the central area of the plate using copper. The copper plate shape hereby corresponds to the heated central area and should preferably be round. Several heat-conducting elements located next to each other may be fixed in relation to each other with expansion play according to their assembly. According to a preferred design of the invention, screw bolts are provided for fixing of the heat-conducting element(s) at the bottom side of the plate. The heat-conducting copper elements preferably have a rectangular diameter and form oblong, rectangular, square, or circle-section formed plate sections having expansion joints in between and large-diameter drill holes for mounting in order to allow heat-related expansion without tension.

According to a preferred embodiment of the invention, an electrical heating device with a radiator pipe or a heating foil, a controller, and a thermostat are provided, and the radiating pipe is preferably designed as a flat pipe radiator which is spirally fixed directly to the plate-shaped heat-conducting elements.

Screw bolts mounted onto the plate are preferably used for securing the flat-pipe radiator. The bolts grip through drill holes in the heat-conducting elements with some play, preferably through spiral spaces and, if applicable, through bar-shaped heat-conducting holding elements which are admitted with a holding nut. For only one single copper plate with spiral-shaped flat-pipe radiator, a metal holding plate screwed to the center and/or the edge is alternatively provided.

By such assembly, a configuration of the electrical heat device is obtained which guarantees a good heat distribution over the entire heating section, while at the same time ideally allowing sufficient play for heat-related dilation in the flat-pipe radiator area itself.

According to a preferred further embodiment of the invention, the electrical heating device is placed in a housing fixed to the bottom side of the plate, the housing preferably being installed by mounting brackets on screw bolts, and the housing preferably having glass wool and an insulation fleece or sheet as insulation in the housing area.

The heating-device housing mounted directly only to the bottom side of the plate is surrounded by a stable supporting housing also mounted to the bottom side of the plate. In a table construction, the leg section is mounted to the bottom of the heating-device housing. This enables a transfer of force from the leg section to the plate outside the central heating area supporting the above-mentioned forming of the trough.

The support housing consists of a stable sheet metal with an electrical control for the heating device. The housing section parallel to the plate is designed also in plate shape and is, if designed as table construction, linked to the leg section by welding, for example.

According to an alternative embodiment of the invention, a heating device operating with gas, with a controller and a thermostat, is provided which preferably has a central and/or ringwise operating burner that is mounted on the bottom side of the plate via screw bolts. Also in this embodiment, the gas heating device is surrounded by a stable support housing that is mounted to the bottom side of the plate to which, if carried out as table construction version, the leg section is mounted, equipped with control devices at its inside or outside.

For easy mounting of the device according to the invention, the closed metal profile may have an axial supporting area for resting on a shoulder created at least partially in a suitable reception hole of a larger plate or the like. Alternatively, the closed metal profile surrounding the plate may be a circular trimmed-in elevation or a trimmed-in ditch that fits into a suitable reception hole of a larger plate or the like in order to serve as a protection against lateral emission of cooked food.

In a preferred design, the device is insertable as a table construction for cooking on low or high heat and dining with several persons, whereas in enlarged embodiments, the plate serves as a tabletop and one sheet metal section is mounted to one leg section within an area between the plate edge and the heating device on the plate.

On the tabletop, several temperature zones are preferably designated, creating one central cooking zone, one circular transition zone, and one radially adjoining circular eating zone. For identification of each zone, it is preferred to use an LED display, a grade display and/or a liquid crystal display, especially for temperature curves. The liquid crystal display can preferably also display information not related to temperature, such as recipes, time, date, etc.

The plate of the appliance can be round, angular, oval, etc. The tabletop can have similar slopes when the appliance is used in the tabletop. It is desirable that the plate shape is adjusted to conform to the form of the tabletop. The table construction can be designed in almost any desired manner with respect to the tabletop, the leg section and the foot section. The leg section can have at least one hollow support that is located centrally below the table center. As an alternative, the support can also have a large diameter in order to create a space for the reception of a gas bottle and/or an integrated refrigerator. Notwithstanding the aforementioned possibilities, a column-shaped support, or any other known leg-shaped support can be used for the design of the leg section.

According to a preferred further embodiment of the invention, the leg section contains a height adjustment device for adjustment of the section to any situation, especially to an optimum eating and preparation height of the participating persons.

The leg section can preferably be mounted on a stable support housing as a detachable device so that the table construction can be removed for the sake of saving space, if not needed. The foot section can be mounted as a detachable device on the leg section in the same manner. The leg and foot sections provided as detachable devices are also advantageous with respect to transport and packing.

According to a preferred further embodiment, the foot section can be designed as one massive part or with at least three equally spaced feet, and can be suitably equipped with a height adjustment device. An electrical connection or gas connection can be advantageously provided in the foot section in order to supply heating energy through the hollow leg section to the heating device.

According to a further preferred embodiment of the invention, an electrical fan associated with the table construction is mounted on the tabletop or on a separate foot to cover at least the central area of the tabletop where the heating device is mounted. Hereby, smells caused by cooking can be removed quite well. The fan may be designed for circulated-air operation and equipped with an active charcoal filter. The fan may have an air valve at the top and a short piece of pipe for a vent during exhaust-air operation or the like.

Further details, characteristics and advantages of the invention can be obtained from the following description that outlines exemplary embodiments of the invention with regard to the enclosed drawings in further detail.

DESCRIPTION OF THE PREFERRED EMBODIMENT

Figure 1:
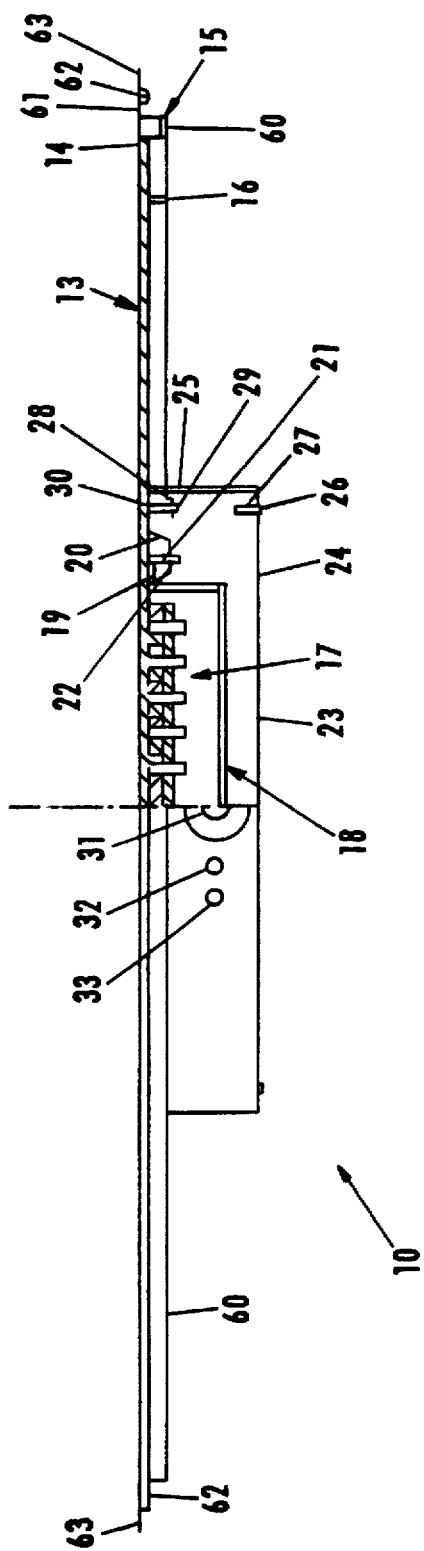
FIG. 1 is a sectional lateral view of a device according to the invention.
Figure 2:
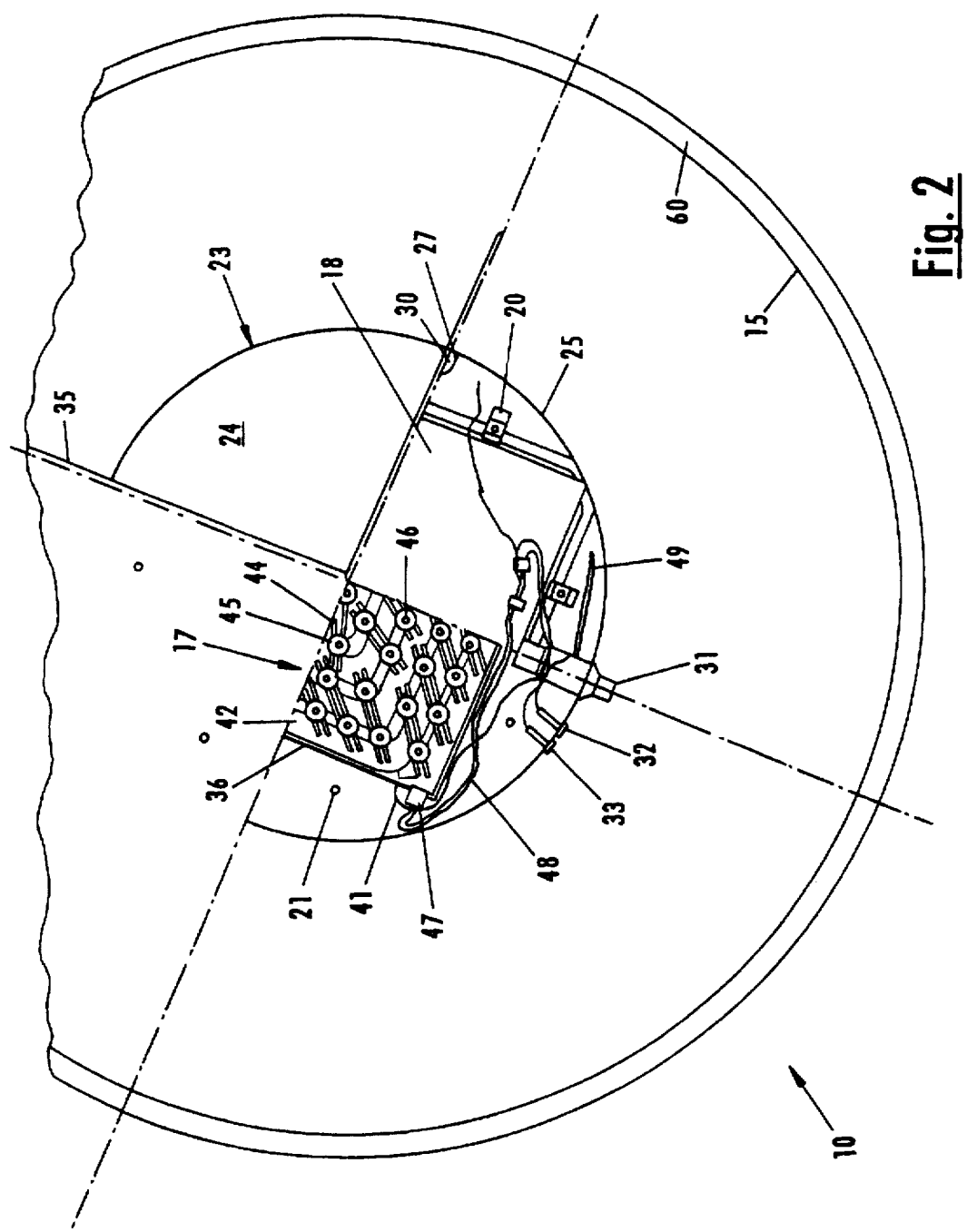
FIG. 2 is a bottom view of the device with several cuts, with the outer support profile not shown.

FIGS. 1 and 2 show a device 10 which has a plate 13 made of fine steel. Plate 13 is round and has a circular edge to which a hollow closed square fine steel profile 15 is welded peripherally around the plate. Profile 15 creates an edge for plate 13, and the profile center lies under the bottom side area 16 of plate 13. The thickness of plate 13 is about 5 mm and the outer diameter of profile 15 is about 25 mm.

At the periphery of plate 13, an axial support area 60, for support on a shoulder (not shown on the drawing), is radially provided, at least in sections. A circular support profile 61 is alternatively or additionally formed or mounted to profile 15 surrounding plate 13. Profile 61 has a surrounding trimmed-in elevation or, as shown in FIG. 1, a trimmed-in depression 62, and a surrounding support edge 63 for hanging into a suitable reception hole of a larger plate or the like.

Figure 3:
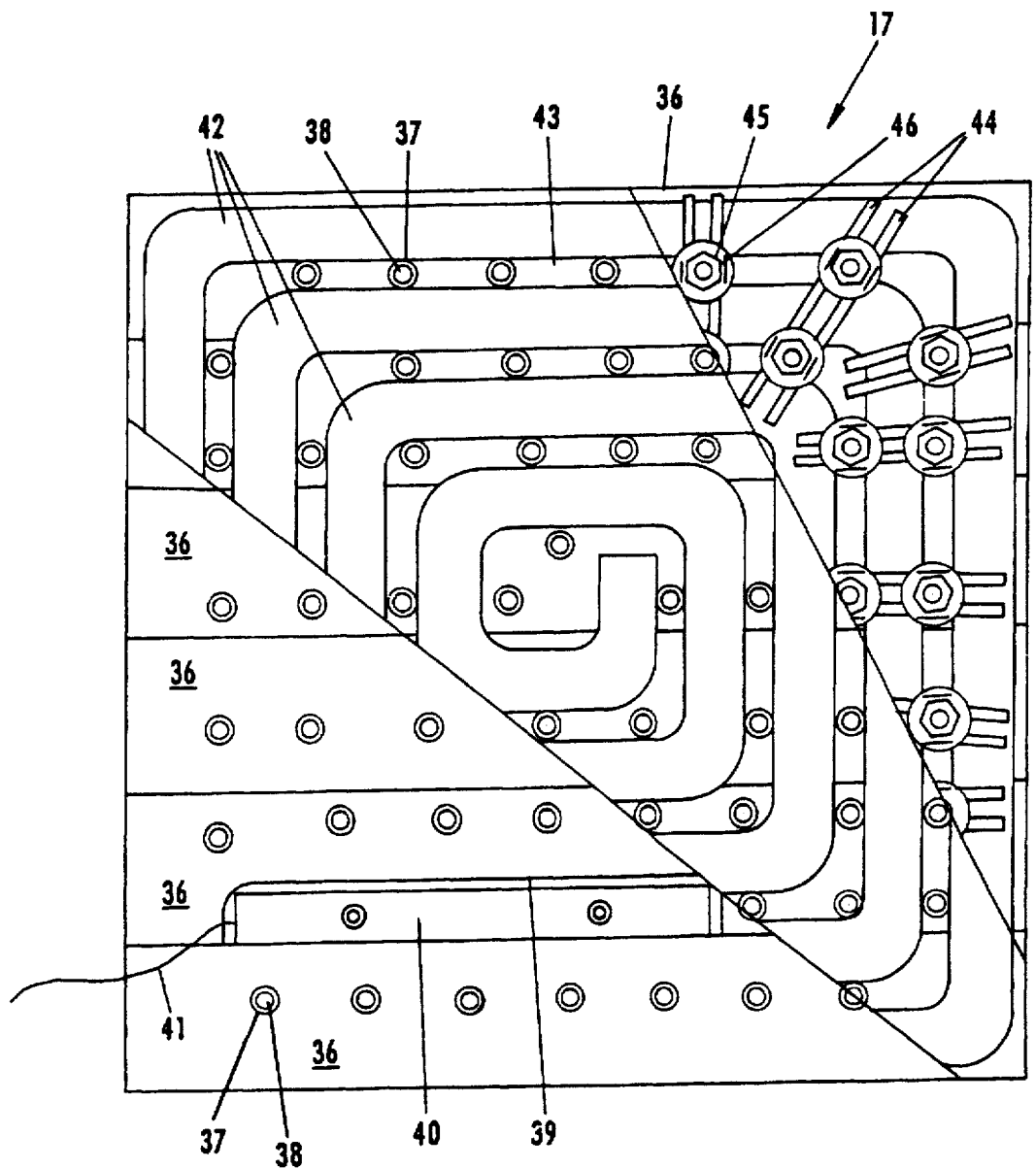
FIG. 3 is a magnified depiction of an electrical heating device.

In the central area of plate 13, a heating device 17 is placed. Further details as to its construction are illustrated in FIGS. 2 and 3. The heating device 17 is surrounded by a housing having a bordered fitting edge 19 which is mounted on the bottom side area 16 with mounting clamps 20. The bottom side area 16 of plate 16 is equipped with screw bolts 21 which pass through mounting clamp 20. A nut 22 is screwed onto the screw bolts and holds fitting edge 19 via the mounting clamp 20 tight to the bottom side 16 of plate 13.

A heating device housing 18 is made in one piece. The space between heating device housing 18 and heating device 17 is filled with glass wool for insulation, (not shown). An additional insulation sheet or insulation fleece is placed within the wall area of heating device housing 18.

The heating device housing 18 is surrounded by a housing 23 that is constructed from a section 24 extending parallel to tabletop 13 and from a section 25 extending vertically to section 24. The housing 23 is made of sheet metal. Section 24 is connected to a thread clip with screws 26 and section 25 is mounted to the bottom side 16 of plate 13 by fixing a nut 29 on screw bolts 30 via clips 28 equipped with a drill hole in the bottom side area 16 of plate 13.

Figure 4:
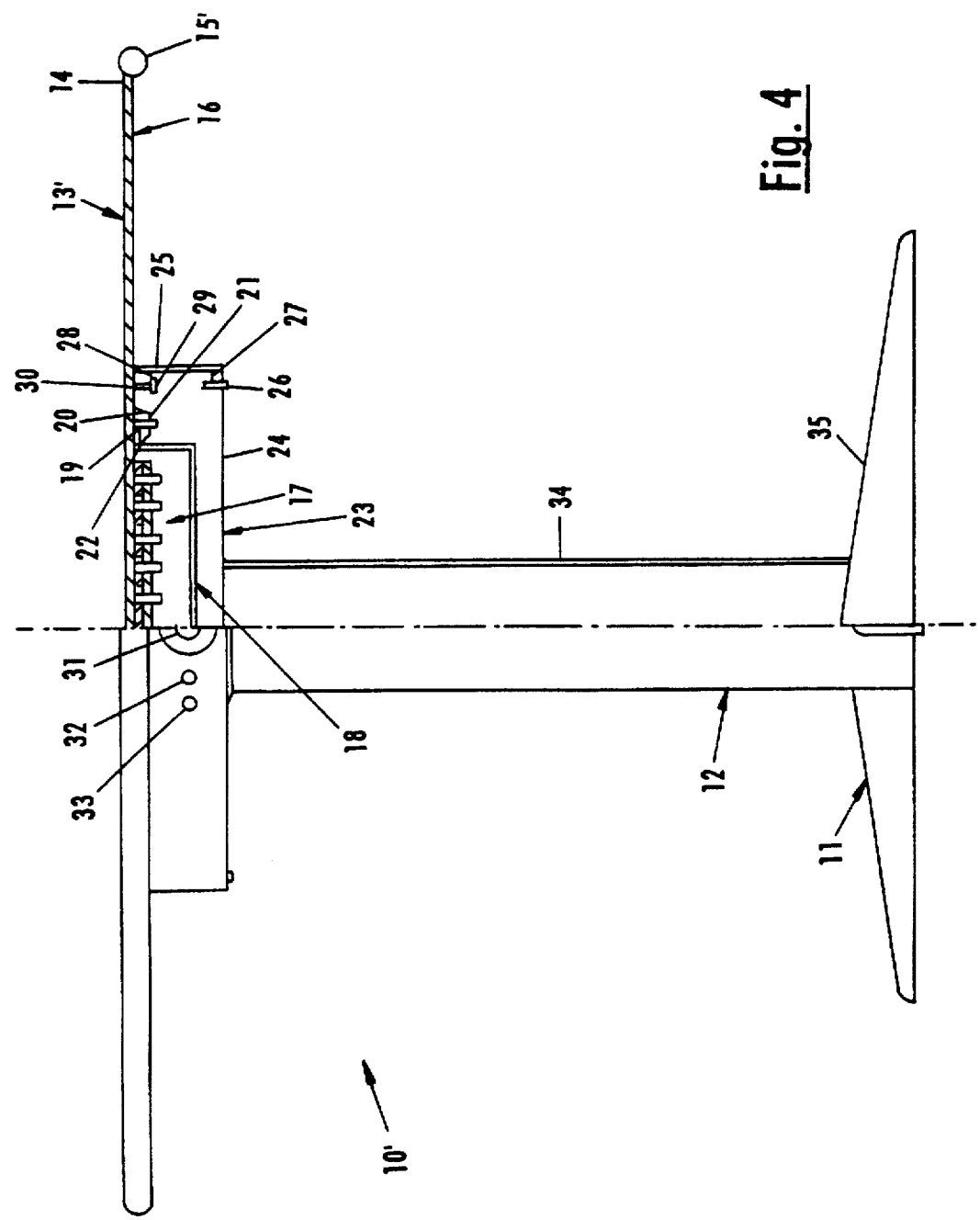
FIG. 4 is a sectional lateral view of an embodiment including a table construction.

Section 25 contains a control button 31 for the electrical heating device 17, an operation voltage display 32, as well as a thermostat operation display 33. A circular support 34 is welded to the central area of section 24 of housing 23 as shown in FIG. 4 for creating a leg section 12. An electrical connection line is placed in circular support 34, not visible on the drawing, which is led to the outside in foot section 11. Foot section 11 has four feet 35, which are welded to the lower end of circular support 34 radially pointing outward. The feet 35 form an angle of 90° with each other, and can be equipped with a height adjustment at one of the feet.

In the embodiment according for FIG. 4, the circular support 34 can alternatively be mounted to a suitable reception pipe on housing 23, to make the circular support a detachable device. Also, the foot area itself can be mounted to the circular support 34 as a detachable connection pipe. Further, multiple circular supports can be provided instead of single circular support 34 between which accessible reception chambers for integrating a refrigerator or the placement of a gas bottle for a gas heating device are created. The leg section can also be equipped with a height adjustment, e.g. designed as a telescope with setscrew for holding a position.

The heating device 17 is clearly visible on FIGS. 2 and 3. It consists of oblong rectangular copper plates 36 which fit directly to the bottom side area 16 of tabletop 13 with a space of 1 to 2 mm between the single copper plates. Copper plates 36 are further equipped with drill holes 37 through which screw bolts 38 pass. Bolts 38 have a much smaller diameter than the drill holes 37 for an unimpaired expansion of the copper plates. A thermostat 40 is directly screwed to a clearance 39 of a copper plate 36 of the bottom area 16 from which a wire 41 is linked with a controller 31.

In FIG. 3, the heating device is depicted on three different levels. A spiral-shaped flat pipe radiator 42 is clearly visible in the diagonally cut section, and drill hole 37 and the screw belts 38 are arranged in spiral spaces 43. In the right part of the sectional FIG. 3, the mounting of the flat pipe radiators 42 is visible together with the copper plates 36 being equipped with bar-formed heat-conducting steel sticks 44 which extend over at least two flat pipe radiator 42 sections located next to each other and which are held by a washer 45 with edge-side deformation and nut 46 screwed onto it.

One section of FIG. 2 shows the termination of the flat pipe radiator 42 with an electrical connection 47 from which wires 48 lead to a controller 31. A current supply cable 49 is also connected with controller 31 and runs preferably within leg section 12 in the embodiment according to FIG. 4.

In order to operate device 10, the desired cooking temperature is selected with controller 31, which is 200° to 220° Celsius, for example. Thermostat 40 controls and maintains the temperature, and control lamps 32 and 33 inform the user about the status of the operating voltage and the thermostat 40.

During further heating up of the central plate area 13 to which heating device 17 is mounted in a hanging position, plate 13 is subjected to expansion. The expansion does not lead to a radial enlargement of the plate or wavy deformation due to clamping of edge 14 with pipe 15. This clamping leads to the formation of a trough. The depth of the trough lies in a range between 22 to 25 mm as compared to the plate edge area depending on the heating temperature. The trough area having a temperature of 200° to 220° Celsius extends above the heat device and has a width of about 40 cm in the embodiment according to FIG. 4 for a table construction 10' with a round table 13' having a diameter of about 1 meter. A circular transition area with a width of about 10 cm is joined radially to the trough area for keeping the meals warm, which can be best used at a temperature of 80°. An outside or eating area with a width of about 20 to 25 cm is radially joined here. In this area, a room temperature of about 20° can be measured. The different zones can be designated with finished surfaces or equipped with incorporated or affixed marking or occasionally with color temperature scale and/or display.

Figure 5:
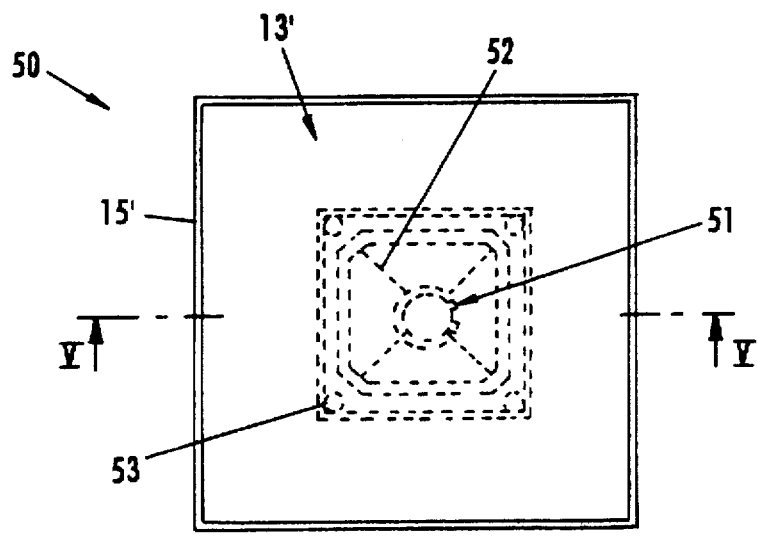
FIG. 5 is a top view onto another example of a table construction with a square tabletop.
Figure 6:
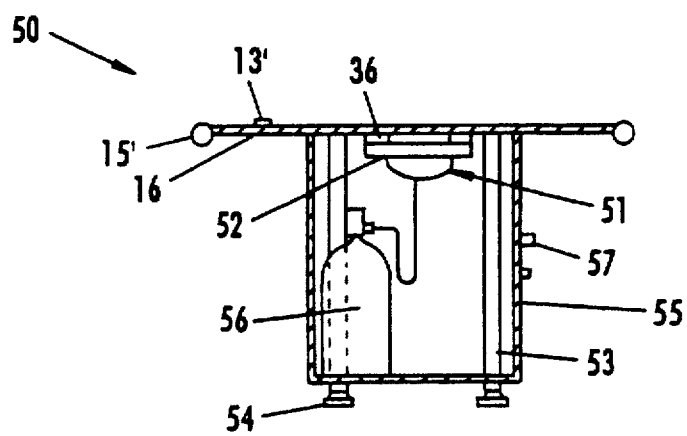
FIG. 6 is a sectional view along the outline v—v in FIG. 5.

FIGS. 5 and 6 show another embodiment of a table construction 50 in top view and partly in sectional view. The fine steel plate 13' is configured as a square and also has a closed fine steel pipe 15' welded around the periphery of the fine steel plate.

A ringlike operating gas burner 51 is provided as a heating appliance which is placed in a holder with intermediate spaces to the copper plates 36 also provided here. Holder 52 forms a heating device housing with air vents and is mounted in hanging position to the bottom side of the tabletop 13' in the same manner as in the first embodiment of a table construction 10'.

Outside the heating device housing or holder 52, four legs 53, which terminate in height-adjustable feet are mounted to the bottom side 16. The four legs 35 are surrounded by a support housing 55 which forms a reception chamber 58 for a gas bottle 56 and/or a refrigerator (not depicted on the drawing). An entrance door to the reception chamber 58 is implied at 57.

A thermostat control for the gas burner has been omitted for reasons of simplification. Operation of the table construction 50 is similar to table construction 10', but with gas. A trough-shaped lowering in the central area of the tabletop 13' is preferably reached here as well, and the edge area of tabletop 13' can also be used as eating space as is the case in table construction 10' as no unpleasant heating takes place due to the poor heat conducting characteristics of fine steel.

According to a further execution of the invention, leg section 12 and foot section 11 can also be designed in the form of a central column with small diameter enabling the table construction to be used in a provided opening on yachts, trailers, and the like. This modified foot or leg section can furthermore be equipped with a point in order to be able to press it into the ground.

I claim:

1. A roasting and cooking device comprising:

a fine steel plate having a top side, a bottom side, and at least one edge;

a heating device mounted on the bottom side and in a central area of the steel plate for heating said central area and causing an expansion of the steel plate in a radial direction; and a closed fine steel profile surrounding the steel plate in the proximity of the edge or edges thereof, for limiting the expansion of the steel plate in the radial direction and creating a trough-shaped deformation in the central area of the plate.

2. A device according to claim 1 wherein the fine steel profile has at least one rounded beveled edge.

3. A device according to claim 1 wherein the fine steel profile has a closed diameter.

4. A device according to claim 1 wherein the fine steel profile is welded to the edge or edges of the fine steel plate.

5. A device according to claim 1 wherein said heating device comprises a radiation source pointed towards the central area of the fine steel plate.

6. A device according to claim 1 wherein the heating device comprises at least one heat-conducting plate shaped element made of copper that is mounted in the central area of fine steel plate to its bottom side by screw bolts.

7. A device according to claim 1 wherein the heating device comprises a flat pipe radiator arranged in a spiral shape.

8. A device according to claim 7 further comprising:

screw bolts mounted on said fine steel plate for mounting the flat pipe radiator to the plate.

9. A device according to claim 7 further comprising a housing for the electrical heating device, said housing including heat insulation and being mounted to the bottom side of the plate.

10. A device according to claim wherein said housing is surrounded by a further housing equipped with electrical control devices and mounted to the bottom side of the plate.

11. A device according to claim 1 herein said heating device is gas operated, and said device further includes a control and thermostat for controlling the gas-operated heating device.

12. A device according to claim 11 wherein the gas heating device is surrounded by a stable housing mounted to the bottom side of the fine steel plate, and wherein the stable housing includes said control device.

13. A device according to claim 1, wherein the periphery of said steel plate has an axial support area for resting on a shoulder formed at least sectionally in a suitable reception chamber of a larger plate.

14. A device according to claim 1 wherein a circular holding profile is fitted to the periphery of the fine steel profile.

15. A device according to claim 1 wherein the fine steel plate is part of a table construction for sociable gathering for cooking and dining with the fine steel plate forming a tabletop said device further comprising:

a leg section being detachably mounted to the table with one support section having at least three feet arranged with equal intermediate spaces.

16. A device according to claim 15 further comprising an optical display on the tabletop for non-temperature related information including at least one of recipes, time, and date.

17. A device according to claim 15 wherein the foot section includes an electrical connection and/or a gas connection.

18. A device according to claim 15 including different temperature zones marked on the tabletop.

19. A device according to claim 18 wherein said different zones are a central cooking zone, a circular transition zone and a radially adjoining circular eating zone.

20. A device according to claim 18 wherein each zone further comprises: an LED display, a temperature display and a liquid crystal display.

21. A device according to claim 15 further comprising:

at least one additional foot section, a heating device housing, and a support housing surrounding the heating device housing, with an intermediate space between the housings extending parallel to tabletop.

22. A device according to claim 21 wherein the leg section includes at least one reception chamber for a gas bottle and/or an integrated refrigerator.

23. A device according to claim 22 wherein the leg section and/or the foot section include a height adjustment control.

24. A device according to claim 15 further comprising:

an electrical fan for the tabletop extending over at least the central area of the tabletop.

25. A device according to claim 24 wherein said electrical fan includes a filter, top-side air valve, and a short piece of pipe, for venting during exhaust-air operation.

* * * * *